(12) United States Patent
Ohara

(10) Patent No.: US 8,661,099 B2
(45) Date of Patent: Feb. 25, 2014

(54) ELECTRONIC APPARATUS AND SYSTEM CAPABLE OF ASSIGNING APPROPRIATE ADDRESS

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1094 days.

(21) Appl. No.: 12/078,468

(22) Filed: Mar. 31, 2008

(65) Prior Publication Data

US 2008/0215712 A1    Sep. 4, 2008

Related U.S. Application Data

(63) Continuation of application No. 10/370,622, filed on Feb. 24, 2003, now Pat. No. 7,370,093.

(30) Foreign Application Priority Data

Mar. 7, 2002    (JP) .................................. 2002-062289
Mar. 13, 2002    (JP) .................................. 2002-068555
Mar. 22, 2002    (JP) .................................. 2002-080858

(51) Int. Cl.
*G06F 15/177*    (2006.01)
(52) U.S. Cl.
USPC ......................................... 709/220; 709/222
(58) Field of Classification Search
USPC .......................... 709/217–219, 220–222, 224
See application file for complete search history.

(56) References Cited

U.S. PATENT DOCUMENTS

| | | | |
|---|---|---|---|
| 5,724,510 | A | 3/1998 | Arndt et al. |
| 5,854,901 | A | 12/1998 | Cole et al. |
| 5,918,016 | A | 6/1999 | Brewer et al. |
| 6,018,771 | A | 1/2000 | Hayden |
| 6,101,499 | A | 8/2000 | Ford et al. |
| 6,377,987 | B1 | 4/2002 | Kracht |
| 6,484,221 | B1 | 11/2002 | Lorinser et al. |

(Continued)

FOREIGN PATENT DOCUMENTS

| | | |
|---|---|---|
| EP | 0 918 411 A1 | 5/1999 |
| JP | A 07-030560 | 1/1995 |

(Continued)

OTHER PUBLICATIONS

Zubair Alexander, Automatic Private IP Addressing, Oct. 25, 1999, Windows It PRO, http://www.windowsitpro.com/article/dns/automatic-private-ip-addressing.*

(Continued)

*Primary Examiner* — Chirag R Patel
(74) *Attorney, Agent, or Firm* — Oliff PLC

(57) ABSTRACT

In order to prevent unnecessary APIPA process from being executed in a LAN environment which does not adopt APIPA, an ICMP echo request for a predetermined IP address is broadcast. Whether there are more than N apparatuses using APIPA is checked based on the replies, and if there are, IP address setting by APIPA is executed. In a LAN environment which adopts APIPA, whether the IP address to be assigned to an apparatus is already being used by another apparatus is checked. If the date and time when the another apparatus was assigned the IP address is earlier than the date and time when the apparatus was assigned the IP address, APIPA is executed to decide the IP address of the apparatus.

20 Claims, 12 Drawing Sheets

(56) References Cited

U.S. PATENT DOCUMENTS

| | | |
|---|---|---|
| 6,532,217 B1 * | 3/2003 | Alkhatib et al. ............... 370/252 |
| 6,621,820 B1 | 9/2003 | Williams et al. |
| 6,687,755 B1 * | 2/2004 | Ford et al. .................... 709/245 |
| 6,810,420 B1 | 10/2004 | Buse et al. |
| 7,035,915 B1 * | 4/2006 | Huo et al. .................... 709/219 |
| 7,075,897 B2 * | 7/2006 | Uematsu ....................... 370/255 |
| 2002/0161879 A1 | 10/2002 | Richard |
| 2003/0056008 A1 | 3/2003 | Russell et al. |
| 2005/0267935 A1 | 12/2005 | Gandhi et al. |

FOREIGN PATENT DOCUMENTS

| | | |
|---|---|---|
| JP | A 07-264211 | 10/1995 |
| JP | A 09-266477 | 10/1997 |
| JP | A 10-126429 | 5/1998 |

OTHER PUBLICATIONS

Microsoft, "Automatic Windows 98/Me TCP/IP Addressing Without a DHCP Server," Oct. 7, 2001, pp. 1-4.
R. Troll; "DHCP Option to Disable Stateless Auto-Configuration in Ipv4 Clients," May 1999, pp. 1-9.
Zubair Aleaxander; "Automatic Private IP Addressing"; Windows. Net Magazine, pp. 1-2; Oct. 25, 1999; XP002217668.
Jun. 11, 2010 Office Action issued in U.S. Appl. No. 12/078,437.
Office Action issued Dec. 3, 2010 in U.S. Appl. No. 12/078,437.
Nov. 16, 2010 European Search Report for European Patent Application No. 10184068.4.

* cited by examiner

FIG.7A

```
┌─ REQUEST ─────────────────────────────────────────────────┐
│ SOURCE IP ADDRESS        0.0.0.0 (VARIED)                 │
│ DESTINATION IP ADDRESS   169.254.78.22 (CONFLICTING IP ADDRESS) │
│ DESTINATION PORT NO.     2436 (NO. DEFINED FOR THIS REQUEST)    │
│ UDP                                                       │
│                                                           │
│ DATA CONTENTS                                             │
│     · FLAG INDICATING REQUEST PACKET                      │
│     · DATE & TIME OF IP ADDRESS ACQUISITION               │
└───────────────────────────────────────────────────────────┘
```

FIG.7B

```
┌─ RESPONSE ────────────────────────────────────────────────┐
│ SOURCE IP ADDRESS        164.254.78.22 (PERSONAL IP ADDRESS) │
│ DESTINATION IP ADDRESS   255.255.255.255 (BROADCAST)      │
│ DESTINATION PORT NO.     2436                             │
│ UDP                                                       │
│                                                           │
│ DATA CONTENTS                                             │
│     · FLAG INDICATING RETURN PACKET                       │
│     · DATE & TIME OF IP ADDRESS ACQUISITION               │
└───────────────────────────────────────────────────────────┘
```

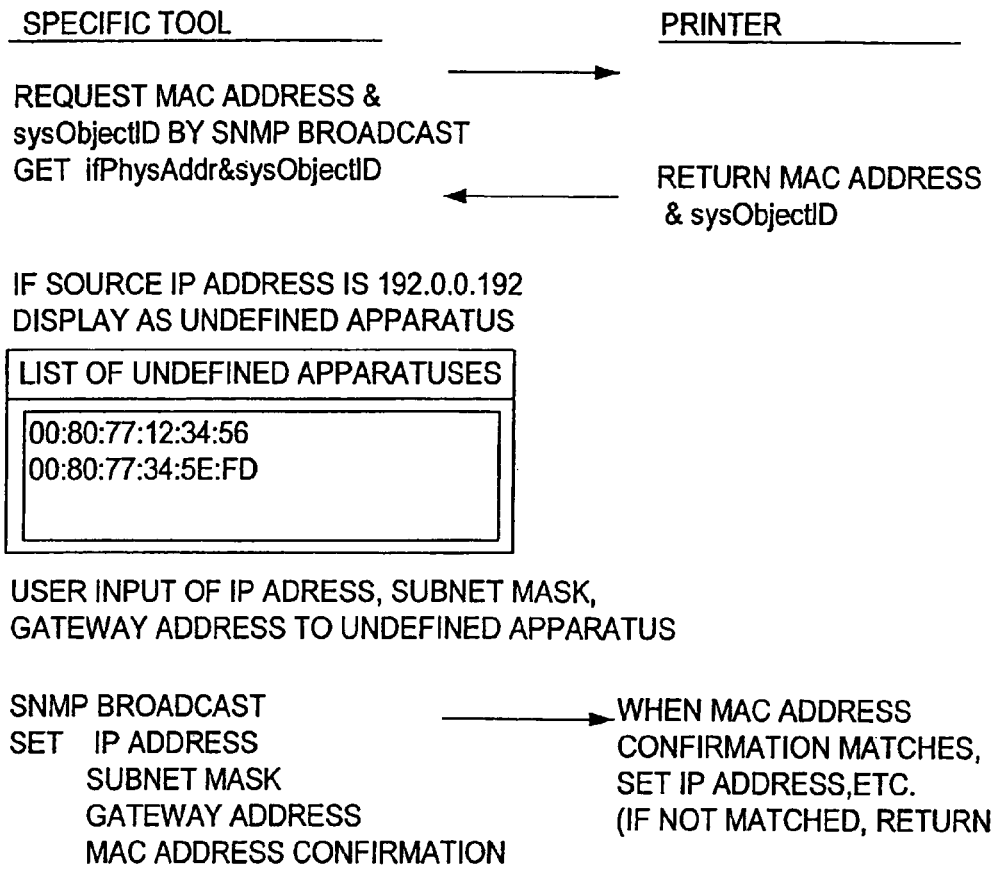

ELECTRONIC APPARATUS AND SYSTEM CAPABLE OF ASSIGNING APPROPRIATE ADDRESS

This is a Continuation of application Ser. No. 10/370,622 filed Feb. 24, 2003. The disclosure of the prior application is hereby incorporated by reference herein in its entirety.

BACKGROUND OF THE INVENTION i) Technical Field of the Invention

This invention relates to an electronic apparatus connectable to a network, and a system and method for deciding the address of the electronic apparatus.

ii) Description of the Related Art

Heretofore, several methods have been introduced for assigning an electronic apparatus an address for communicating with other apparatuses in a network. For example, the electronic apparatus may be assigned a predetermined static address manually, or it may obtain an address automatically from a Dynamic Host Configuration protocol (DHCP) server when the TCP/IP protocol is installed. Automatic Private IP Addressing (APIPA) which enables an electronic apparatus to automatically assign itself an IP address is also well-known.

APIPA is now becoming a standard feature of an operating system installed in a personal computer, etc. The electronic apparatus having the APIPA feature selects an IP address in a range of addresses from 169.254.1.0-169.254.255.255 within an IP address range (169.254.0.0-169.254.255.255) called linklocal address. Then, it uses Address Resolution Protocol (ARP) to ensure that the chosen address is not already being used by another electronic apparatus. Once the electronic apparatus is ensured that the chosen address is not in use, it assigns itself the chosen address. APIPA is also called AutoIP.

FIG. 4 illustrates an example of this APIPA process. Firstly, an IP address is selected randomly. In FIG. 4, an address 169.254.123.98 is selected. Then, an ARP request is sent to see whether there is an electronic apparatus which is assigned the IP address 169.254.123.98. If a reply to the ARP request is received from the address 169.254.123.98, it is determined that the chosen address 169.254.123.98 is already in use, and another IP address is selected randomly again. In FIG. 4, an address 169.254.78.22 is selected. An ARP request for the address is sent to ensure that the address is not already being used by another apparatus. There is no reply this time, and it is thus determined that there is no apparatus which is assigned the chosen IP address. The ARP request is sent once again by way of precaution. If no reply is received, the chosen IP address (169.254.78.22 in FIG. 4) is assigned to the electronic apparatus.

An electronic apparatus which is not adapted to APIPA generally has a fixed IP address, and the fixed IP address is not necessarily a linklocal address. Therefore, if the IP address of an electronic apparatus is automatically assigned by APIPA in a network where there are many conventional electronic apparatuses which are not adapted to APIPA (for example, apparatuses with the address 11.22.33.*), those conventional electronic apparatuses are unable to access the apparatus using TCP/IP protocol.

In addition, if such an APIPA feature is added to a conventional electronic apparatus, there may be a case in which other apparatuses are unable to specify the address assigned by the electronic apparatus itself and consequently, the other apparatuses are unable to communicate with this electronic apparatus.

For instance, a printer connectable to a network is generally given a predetermined default IP address (for example, 192.0.0.192) before shipped. Management software installed in a personal computer communicates with the printer by the default IP address, and assigns a new IP address to the printer which is appropriate in the network.

However, if the APIPA feature is added to the printer, the printer automatically assigns itself an IP address in a range from 169.254.1.0-169.254.254.255 at random. Therefore, other apparatuses are unable to communicate with the printer by the default IP address, and the management software cannot access the printer unless it is informed of the IP address assigned by APIPA. In this case, the user has to directly operate the printer to modify the settings and control the printer by means of an operation panel thereof, for example. This is time-consuming.

As above, the conventional apparatus comprising the APIPA feature automatically assigns itself an IP address even if it should not do so, and thus, problems may occur when other apparatuses intend to communicate with the apparatus.

In addition, automatic address decision by APIPA is performed at the time an apparatus is started. The apparatus comprising the APIPA feature selects an IP address randomly in the above explained manner every time the apparatus is started. As a result, the IP address is changed every time the apparatus is started. Since there is an apparatus which communicates with other apparatuses with direct addressing, it is not preferable that the IP address of an apparatus is frequently changed. If the IP address of an apparatus is frequently changed, a conventional network apparatus which keeps the IP addresses of the other apparatuses as fixed addresses for communication over TCP/IP can no longer communicate with the other apparatuses.

Furthermore, the more apparatuses are in the network, the higher the ratio of the chosen IP address being already in use becomes. As a result, traffic in the network becomes heavy due to the excess ARP requests and replies.

In order to prevent an IP address from being changed at the time of restoration of an apparatus, the address assigned by APIPA is stored in a nonvolatile storage of the apparatus and selected as the first possible IP address of the apparatus. If every apparatus in the network performs such a process, the address of the apparatus will be fixed to a certain address as the apparatus is used in a long term. Accordingly, communication with the apparatus by direct addressing becomes possible and extra communications in the network exchanged to decide an address of the apparatus are avoided.

However, even if the address stored in the nonvolatile storage is sent as an ARP request, another IP address has to be selected again in case that there is a reply, that is, the address which has been used by the apparatus is already being used by another apparatus.

In this respect, there may be a case in which the address change is not desirable. For example, while a printer which has been using an address A for a long time in a network is turned off, a new personal computer becomes a member of the network and assigns itself the address A. When the printer is powered on, since the address A is already being used by the personal computer, the printer has to assign itself a new address B. As a result, the apparatuses in the network which have been transmitting print data to the address A fail to print the print data.

To prevent the above problem from happening, a fixed IP address may be, assigned to the apparatuses adapted to APIPA in the same manner as in the conventional network apparatuses. Then, it is necessary to find an efficient way to find the apparatuses adapted to APIPA.

SUMMARY OF THE INVENTION

One object of the present invention is to provide an electronic apparatus which can assign an apparatus an appropriate address for communication without problem even if the apparatus is adapted to APIPA.

Another object of the present invention is to provide a system and method to decide an address of an apparatus without problem even if the apparatus is adapted to APIPA.

Still another object of the present invention is not to execute APIPA when unnecessary.

Further object of the present invention is not to change an IP address of an apparatus adapted to APIPA frequently.

Still further object of the present invention is to enable finding an apparatus adapted to APIPA and to assign the apparatus an appropriate address preferentially.

In order to attain the above objects, one aspect of the present invention provides an electronic apparatus which determines whether an apparatus having a function to automatically assign itself an address for communication should automatically assign itself an address to communicate with other apparatuses in a network, based on communications exchanged in the network, and outputs the determination result.

For example, an administrator of a network can refer to the determination result and determine whether or not to inactivate the function of the apparatus to assign itself an address when connecting the apparatus to the network. If the determination result is that the apparatus should automatically assign itself an address, the administrator can be ensured that the apparatus having the function to automatically assign itself an address can be connected to the network with that function activated. Otherwise, the administrator inactivates the function and configures the apparatus to use a default address, or connects the apparatus after assigning a static address.

The determination result may be outputted to a display device, printing device, audio output device, or a variety of notification devices comprising the forgoing devices. The determination result may be outputted to the network as well.

Whether the apparatus having the function to automatically assign itself an address should execute the function can be determined based on communications related to an apparatus which is assigned an address of a predetermined address group, preferably, of an address group from which an address of the apparatus having the function to automatically assign itself an address is to be chosen.

It is preferable that the predetermined address group is within an address range called linklocal address. For instance, in case of an Ipv4 network, the address group may comprise addresses in a range from 169.254.1.0-169.254.254.255. These are the addresses which can be selected by APIPA, among addresses in a range from 169.254.0.0-169.254.255.255 called linklocal address.

It is possible to determine whether there is an apparatus on the network which is assigned an address of the predetermined address group by making an inquiry to other apparatuses on the network and examining the responses. This means that the aforesaid communications can be the responses to the inquiry.

For example, it is possible to determine whether the apparatus should automatically assign itself an address based on the responses to the inquiry, to the other apparatuses on the network, on whether they have an address of the predetermined address group. If the address of the apparatus is an IP address, an ICMP echo request for the network address of the predetermined address group can be broadcast, and based on the responses to the broadcast, it can be determined whether the apparatus should automatically assign itself an address. Such an inquiry requires a comparatively short time for the determination.

Whether there is an apparatus on the network which is assigned an address of the predetermined address group can be also determined by monitoring an address contained in a packet exchanged between the apparatuses in the network. In this case, the aforesaid communications can be the address monitored.

For example, it is possible to determine that the apparatus should automatically assign itself an address when the monitored address is an address of the predetermined address group. In this manner, the determination can be performed without transmitting any information to the network, thus reducing a load of the network.

As above, whether the apparatus should automatically assign itself an address can be determined based on the responses to the aforesaid broadcast or the monitoring, that is, whether an address of the predetermined address group is detected. If an address of the predetermined address group is detected, it is possible to determine that the apparatus should automatically assign itself an address and activate the function.

Here, if an apparatus exists which has already assigned itself an address by mistake and only the determination on whether an address of the predetermined address group is detected is performed, there is a possibility that it is wrongly determined that the apparatus should automatically assign itself an address. Particularly, in a network environment where there is an apparatus which automatically assigns itself an address, such as a personal computer with an OS having the APIPA feature installed, the incorrect result is likely to be obtained. Therefore, even if a response or communication related to such an apparatus is detected, the electronic apparatus of the present invention must correctly determine that the apparatus having the function to automatically assign itself an address should not automatically assign itself an address in the given network.

Accordingly, it is preferable to determine that the apparatus should automatically assign itself an address when more than a predetermined number of apparatuses are detected which are assigned an address of the predetermined address group. Furthermore, it is preferable to determine that the apparatus should automatically assign itself an address when more than a predetermined ratio of apparatuses are detected which are assigned an address of the predetermined address group. The predetermined ratio can be a ratio of the number of packets containing the address of the predetermined group to the total number of packets monitored.

Moreover, even if the apparatuses which are assigned an address of the predetermined address group are not detected more than the predetermined number or ratio, it is desirable to be determined that the apparatus automatically assigns itself an address when the number of the response to the broadcast or the number of the monitored packets does not reach a predetermined number. In case that a new network is being constructed in which each of the apparatuses in the network should automatically assign itself an address, apparatuses which are assigned an address of the predetermined address group are never detected more than the predetermined number or ratio even though the response to the broadcast is checked and the monitoring of packets is performed. Thus, the network in which each of the apparatuses should automatically assign itself an address can never be constructed. Therefore, even if the apparatuses which are assigned an address of the predetermined group is not detected more than the predetermined number or ratio, it is desirable to determine that the apparatus should automatically assign itself an address when the number of the response to the broadcast or the number of the monitored packets does not reach the predetermined number, assuming that the given network is a new network currently being constructed. Particularly, it is extremely effective to determine that the apparatus should automatically assign itself an address when the number of the response or the number of the monitored packets is equal to zero (0).

Such determination should be performed once again when it is determined that the apparatus should not automatically assign itself an address. Because there is no apparatus which is assigned an address of the predetermined address group if the apparatus is the first member in the network, and it is thus determined that the apparatus should not automatically assign itself an address. If the determination is made once again after a while, it is possible to determine that the apparatus should automatically assign itself an address anew since an apparatus like a personal computer which assigns itself an address may be joined to the network, and the correct determination result can be obtained.

The electronic apparatus which performs such determination and outputs the result may serve as the apparatus having the function to automatically assign itself an address.

In this case, it is preferable that the electronic apparatus is provided with an address decision device instead of or in addition to the output device that outputs the result. When it is determined that the apparatus should automatically assign itself an address, the electronic apparatus assigns itself an address decided by the address decision device. This makes possible for the administrator not to refer to the determination result when he/she places the apparatus in the network, since the electronic apparatus can directly process the determination result.

The expression "instead of or in addition to the output device" indicates that the apparatus may or may not comprise the device that outputs the determination result.

As above, the present invention allows appropriate address assignment, and prevents adverse effects which may be caused by an apparatus having the function to assign itself an address, regardless of a network environment where the apparatus is placed.

For instance, when it is determined that the electronic apparatus should not automatically assign itself an address and the apparatus has been given a default address in advance, other apparatuses can communicate with this apparatus by the default address.

For instance, it is possible for the apparatus to select an address from a predetermined address group, and after verifying that the chosen address is not being used by another apparatus in the network, assign itself the chosen address. The predetermined address group can be within the address range called linklocal address.

It is preferable that the determination on whether the apparatus should automatically assign itself an address is performed when the apparatus is powered on. In this manner, when it is determined that the apparatus should automatically assign itself an address, the apparatus can assign itself an address right after it is powered on. If it is determined that the apparatus should not automatically assign itself an address, the apparatus can communicate with other apparatuses in the network by the default address, if any, just after it is powered on.

Another aspect of the present invention provides an address decision system which, when a first electronic apparatus is started and it is verified that an address stored in a nonvolatile storage unit is the same address used by a second electronic apparatus, obtains a result of comparison between priorities of both the first and second electronic apparatuses. If the priority of the first electronic apparatus is higher than the priority of the second electronic apparatus, the stored address is assigned to the first electronic apparatus. The second apparatus is assigned another address chosen by a second address decision unit. If the priority of the first electronic apparatus is lower, another address chosen by a first address decision unit is assigned to the first electronic apparatus.

The above address decision system allows either of the first and second electronic apparatuses which has higher priority to use the address, when both intend to use the same address. Accordingly, by setting priority of a printer (i.e. first electronic apparatus) which has long been using an address A in the above network higher than priority of a personal computer (i.e. second electronic apparatus), the printer can continue using the address A, even if the personal computer assigns itself the address A while the printer is turned off. The apparatuses in the network which have been sending print data to the address A can succeed in printing the print data on the printer.

The above address decision system can restrain the address of the apparatus which has higher priority (first electronic apparatus) from changing. As a result, workings of important apparatuses with higher priority cannot be interrupted easily. In addition, this leads to reduction of the network maintenance and running costs. The nonvolatile storage unit to be used can be EEPROM, backup RAM, hard disk, etc.

It is specifically preferable that the verification device to see whether the stored address and the address of another apparatus are the same are provided with the first and second electronic apparatuses respectively, and that the address decision by the second electronic apparatus is performed when a second verification unit, provided with the second electronic apparatus verifies that the addresses of the first and second apparatuses are the same. This enables each of the apparatuses to assign itself different address voluntarily without any specific instructions, and simplifies the system structure.

It is specifically preferable that the first address decision unit selects another address for the first electronic apparatus when the comparison device is unable to compare priorities of the first electronic apparatus and a third electronic apparatus which has the same address as the stored address. If the first electronic apparatus keeps the stored address unilaterally when the comparison is not performed, there is a possibility that two identical addresses exist on the network. Therefore, in such a case, it is desirable to assign another address to the first electronic apparatus. The comparison is not performed, for example, when the priority of either of the electronic apparatuses is unknown.

It is preferable that each electronic apparatus in the network may function as the address decision system explained above. In this case, the electronic apparatus, when it is started and verifies that an address stored in its nonvolatile storage unit is the same address as is already being used by another electronic apparatus, obtains a result of comparison between priorities of the electronic apparatus itself and the another electronic apparatus. If the priority of the electronic apparatus is higher than the priority of the another electronic apparatus, the stored address is assigned to the electronic apparatus. If the priority of the electronic apparatus is lower, another address chosen by an address decision device is assigned to the electronic apparatus.

In this aspect of the invention, it is preferable that the electronic apparatus selects an address at random from a predetermined address group, and after verifying that the chosen address is not being used by another electronic apparatus, assigns itself the chosen address. The aforesaid predetermined address group can be within the address range called linklocal address.

The priority to be kept in the electronic apparatus may be at least one of data and time when the electronic apparatus was assigned an address, a rank based on its characteristics, and a rank based on its user.

For instance, the earlier the date and time when the address of the electronic apparatus was assigned, the higher the priority of the electronic apparatus is. Then, it is possible to prevent the address of the older apparatus from changing when a new apparatus becomes a member of the network. It is preferable to store the date and time information at the time when the assigned address is written to the nonvolatile storage unit. As to ranking according to the apparatus characteristics, the apparatus such as a server, the address of which is not desirable to be changed, should be ranked high. As to ranking according to the apparatus user, the apparatus of a general manager can be ranked higher than a chief. In this manner, stability of the network system based on the importance of the duties of the user can be achieved.

In order to obtain the result of comparison between the priorities of an electronic apparatus and another electronic apparatus, it is preferable that the electronic apparatus comprises a transmission device that sends the stored priority of the electronic apparatus itself to the another electronic apparatus, a reception device that receives the priority of the another electronic apparatus sent from the another electronic apparatus, and a comparison device that compares the stored priority of its own and the priority received by the reception device. If the another apparatus also comprises the aforesaid devices, it is possible to obtain the result of the priority comparison.

Consequently, there is no need for each of the apparatuses to store the priority of the apparatus itself together with priorities of other apparatuses, and for the user to input and manage the priorities. Furthermore, it is not necessary for the server connected to the network to store, manage and compare the priorities of the respective apparatuses. Cases in which the comparison result is not obtained are those in which the priority to be sent from the another electronic apparatus is not received, and in which the comparison result is not received though requested to the server.

If the electronic apparatus of the present invention is a computer, the above explained address setting function of the electronic apparatus can be an executable program. In this case, the program may be stored in storage media such as flexible disk, magnet optical disc, CD-ROM, hard disk, ROM and RAM. The computer may load the program from such media or over the network to be executed where appropriate.

An address setting apparatus of the present invention comprises an acquisition device that obtains the current address of the apparatus connected to a network, and a determination device that determines whether the obtained address is not of the network to which the address setting apparatus belongs and is also not a default address (initial address) of the apparatus, and a notification device that notifies information specifying the apparatus.

Accordingly, even if the user changes the address of an apparatus to a wrong address which is not of the network to which the address setting apparatus belongs, it is possible to find the apparatus with the wrong address.

BRIEF DESCRIPTION OF THE DRAWING

The invention will now be described, by way of example, with reference to the accompanying drawings, in which:

FIGS. 7A and 7B are explanatory views illustrating an example of data contents of a date and time request packet and return packet and an IP address and port number;

FIG. 11 is an explanatory view showing an address setting process in the personal computer as a conventional address setting apparatus and notification to a user.

DETAILED DESCRIPTION OF PREFERRED EMBODIMENT

First Embodiment

Figure 1:
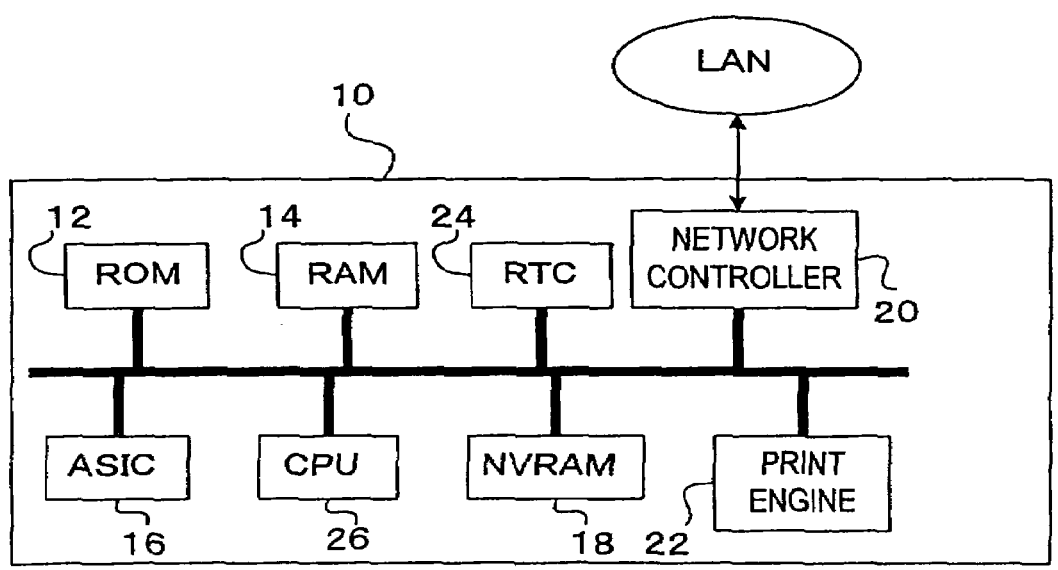
FIG. 1 is a block diagram showing a printer configuration as an electronic apparatus of the first embodiment.

FIG. 1 is a block diagram showing a printer 10 as an electronic apparatus of the present embodiment.

The printer 10 comprises a ROM 12 for storing data and programs necessary for various operations, a RAM 14 for storing temporary data, an ASIC (Application Specific Integrated Circuit) 16 for executing application specific programs, a NVRAM 18 which is a rewritable nonvolatile memory, a network controller 20 for data transmission and reception which monitors packets passing through a LAN and receives and transmits necessary packets from and to the LAN, a print engine 22 for printing, a realtime clock (RTC) 24, and a CPU 26 for controlling the forgoing components.

Wide variety of not shown apparatuses such as a plurality of personal computers, etc. are connected to the LAN. Each personal computer is provided with a printer driver for making a printing request to the printer 10 and a management tool for various settings.

In the printer 10, the CPU 26 executes the programs stored in the ROM 12 to control the network controller 20, etc., thereby communication over TCP/IP being enabled. The printer 10 performs an address setting process after switched on.

Figure 2:
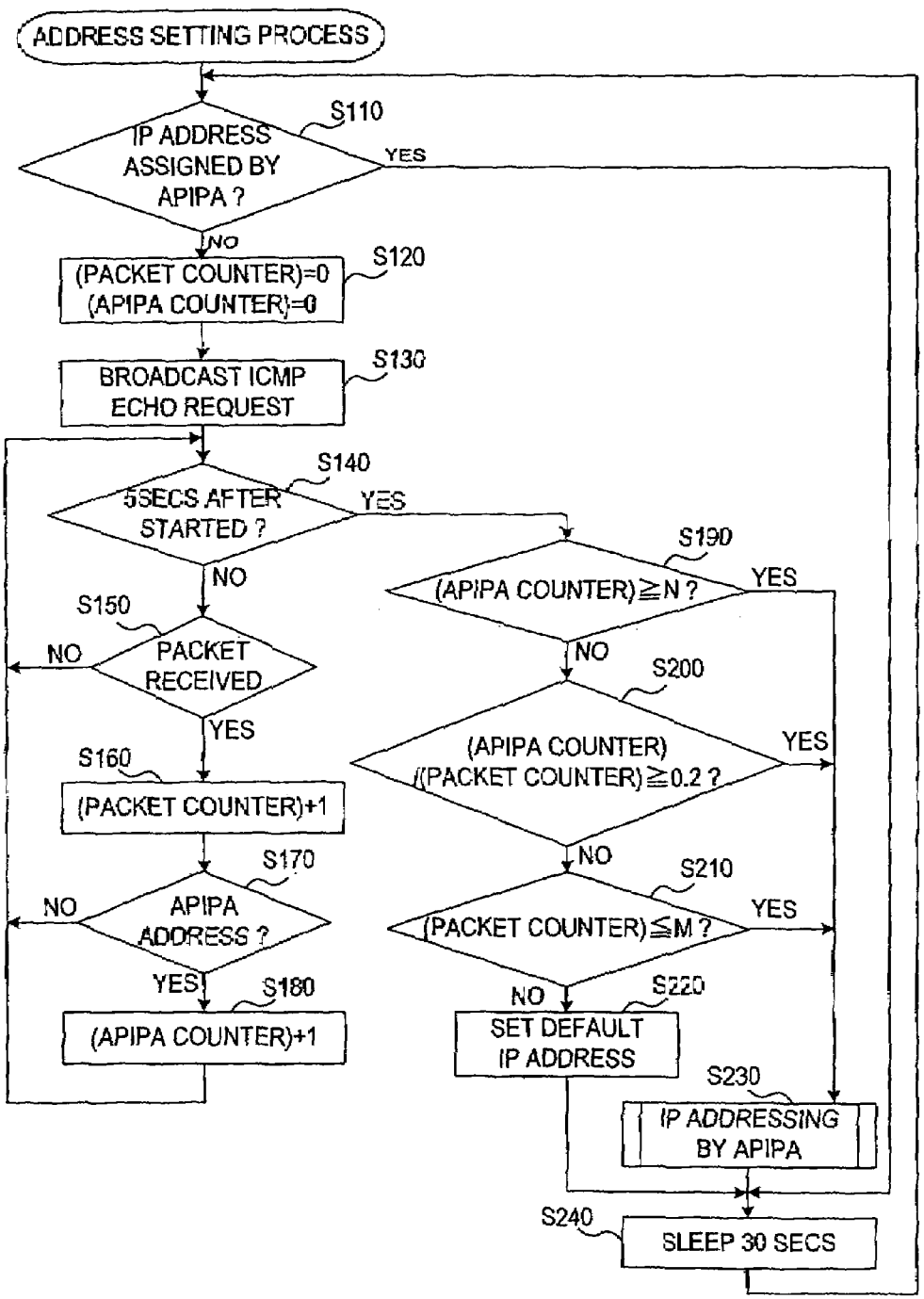
FIG. 2 is a flowchart of an address setting process in the printer as an electronic apparatus of the first embodiment.

Firstly, as shown in step S110 in FIG. 2, it is determined whether an IP address has already been assigned by the later-described APIPA in step S230. In other words, it is determined whether an IP address assigned by APIPA is stored in the NVRAM 18. If an IP address has been assigned by APIPA in step S230 (S110: YES), the process proceeds to step S240.

On the other hand, if an IP address is not assigned by APIPA in step S230 (S110: NO), the value of a packet counter for counting the number of received packet and the value of an APIPA counter for counting the number of detected APIPA address (or the type of APIPA address) provided in the RAM 14 are set to zero (0) (S120), and the process proceeds to step S130.

In step S130, an ICMP echo request for an IP address 255.255.255.255 is broadcast through the LAN. Consequently, all the apparatuses connected to the LAN transmit an ICMP reply to the LAN.

In step S140, it is determined whether 5 seconds have passed since the present address setting process is started. If 5 seconds have not yet passed (S140: NO), it is determined whether a reply (ICMP reply) packet to the ICMP echo request broadcast in step S130 is received (S150). If no reply packet to the ICMP echo request is received (S150:NO), the process returns to step S140. If a reply packet to the ICMP echo request is received (S150: YES), the packet counter is incremented (S160), and it is determined whether an IP address contained in the packet received is an IP address in the range (from 169.254.1.0-169.254.254.255) assigned by APIPA (S170).

If the IP address contained in the packet received is not an IP address assigned by APIPA in step S170 (S170: NO), the process returns to step S140 to check another packet. If an IP address contained in the packet received is an IP address assigned by APIPA (S170:YES), the APIPA counter is incremented (S180), and the process returns to step S140. In other words, by repeating steps S140-S180, the number of reply (value of the packet counter) to the ICMP echo request broadcast in step S130 and the number of APIPA address (value of the APIPA counter) are counted (packet counter≥APIPA counter).

If it is determined that five seconds have passed since this process is started (S140: YES), steps S190 and afterward are performed. In other words, it is determined in step S190 whether the APIPA counter is equal to or more than an integer N. The N may be set to one (1), for example, or any plural number. If it is determined that the APIPA counter is less than N (S190: NO), it is determined whether the ratio of the APIPA counter to the packet counter is equal to or more than 0.2, or the number of packet containing an APIPA address is equal to or more than 20% of the received packets (S200). The value of 20% can be changed at discretion of the network administrator.

If it is determined in step S200 that the ratio of the APIPA counter to the packet counter is less than 0.2 (S200: NO), it is further determined whether the packet counter is equal to or less than an integer M (S210).

If, and as far as, steps S190-S210 are all negatively determined, an IP address of the printer 10 is set to a default IP address 192.0.0.192 (S220), and the process proceeds to step S240. On the other hand, if any one of steps S190-S210 is positively determined, APIPA is performed (S230), and the process proceeds to step S240.

If one of the followings are true: an IP address by APIPA has already been set in step S110 (S110: YES); a default IP address has been set in step S220; and APIPA has been performed in step S230, then, the process returns to step S110 after a sleep of 30 seconds in step S240.

Figure 3:
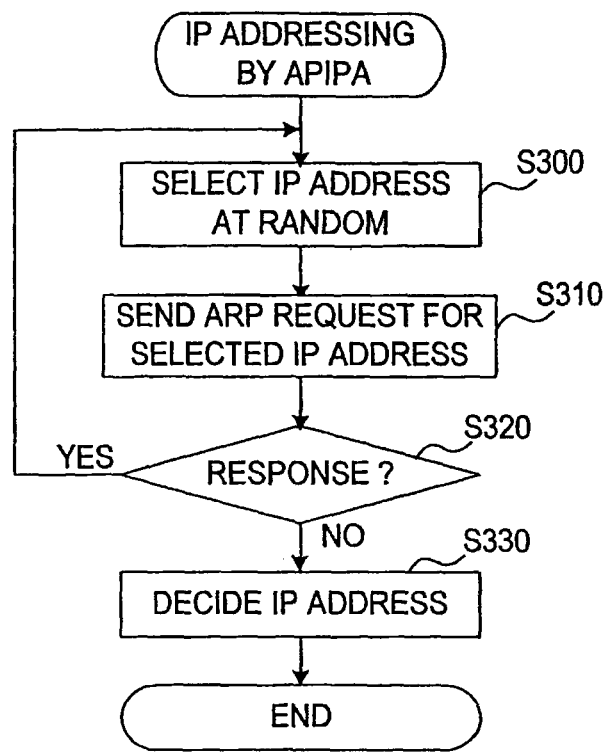
FIG. 3 is a flowchart of an IP addressing process by APIPA.
Figure 4:
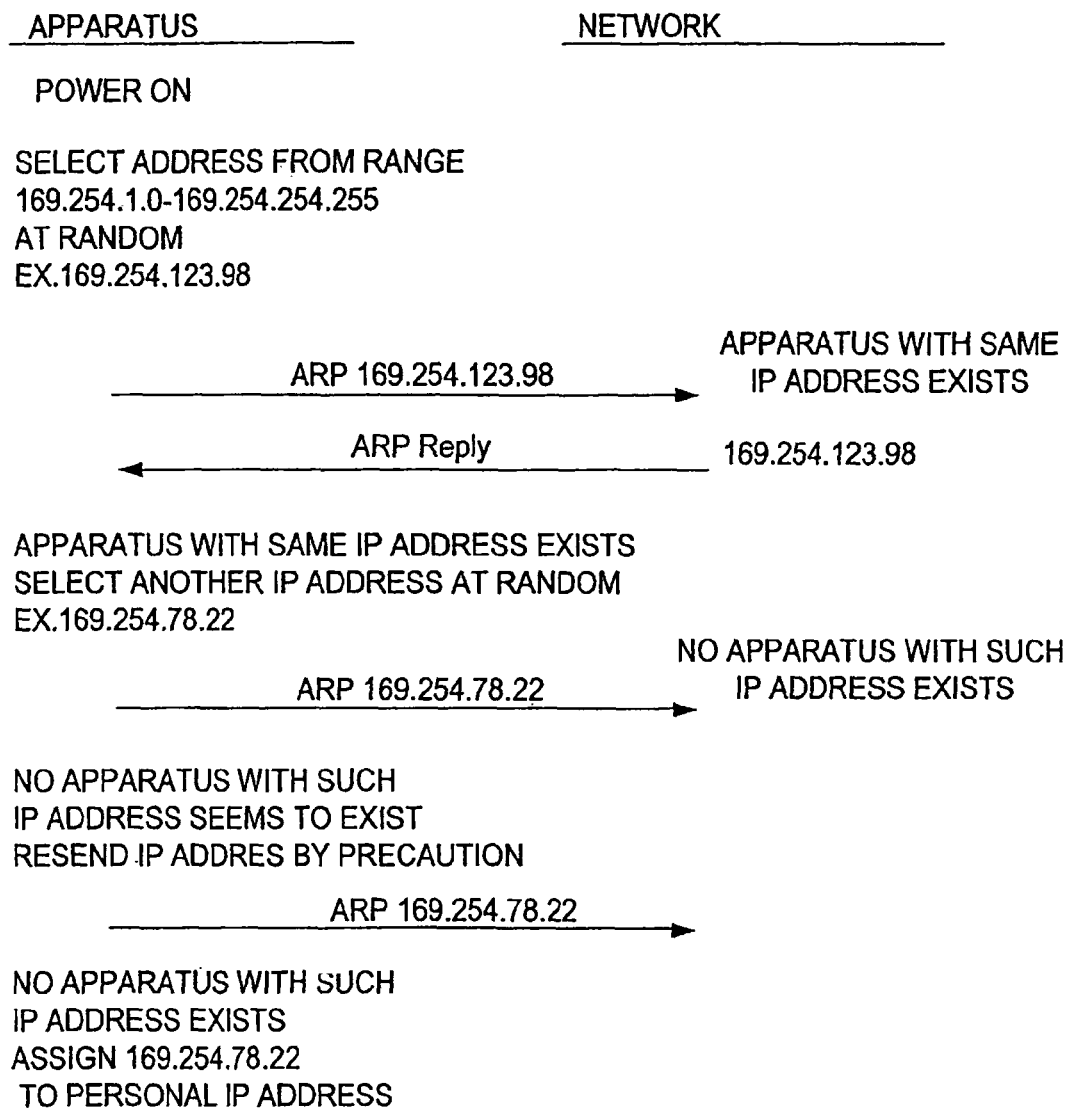
FIG. 4 is an explanatory view illustrating an automatic addressing performed in an apparatus by APIPA.

Here, APIPA (S230) performed in FIG. 4 is explained in detail by way of a flowchart shown in FIG. 3.

When this process is started, an IP address is selected from the address range from 169.254.1.0-169.254.254.255 at random (S300), and an ARP request for the chosen IP address is sent to the LAN from the network controller 20 (S310). Then, it is determined whether there is a response to the ARP request made in step S310 from the LAN to the network controller 20 (S320). In other words, it is determined whether the chosen IP address is not being used by another apparatus connected to the LAN. If there is a response (S320: YES), the process returns to step S300 since the chosen IP address is already in use, and select another IP address. On the other hand, if there is no response received (S320: NO), the chosen IP address is not in use, and the chosen IP address is set to an address of its own (printer 10) (S330), and the IP address is stored in the NVRAM 18.

As above, in this embodiment, an ICMP echo request for 255.255.255.255 is broadcast, and from the resultant reply, it is determined whether there are N or more apparatuses (terminals, etc.) to which the IP address is assigned by APIPA (S190), or whether the ratio of the number of replies from the apparatuses to which the IP address is assigned by APIPA out of the total number of replies is equal to or more than a predetermined value (S200). Since it is determined whether an IP address should be set by APIPA as such, it is possible to prevent APIPA from being executed in a LAN environment in which it is considered that APIPA is not adopted. In other words, since APIPA is executed after it is ensured that the present network environment seems to adopt APIPA, no unnecessary IP addressing (automatic addressing) is executed.

When a new network environment adopting APIPA is being constructed, even if an ICMP echo request for 255.255.255.255 is broadcast, there is no apparatus which makes a reply (or almost none at the stage of the beginning of constructing the network). Therefore, no positive determination result is obtained in steps S190 and S200, and it is likely that a network adopting APIPA can never ever be built. However, even if negative determination results are obtained in steps S190 and S200, proper address settings are possible if the apparatus is designed to execute APIPA when the number of apparatuses responding to the broadcast is equal to or less than M (it is desirable that M is equal to zero (0) or an extremely small value compared to the number of terminals connectable to the network) (S210: YES).

Accordingly, when the LAN environment does not adopt APIPA, it is possible to perform various operations, by using default IP addresses, like setting a new IP address to the printer 10 by way of a management tool conventionally used in a personal computer, etc.

In the present embodiment, it is determined whether APIPA is executed based on the reply (S190-S210, etc.) to an ICMP echo request broadcast (S130). However, packets passing through a LAN may be monitored (received) via the network controller 20 (this step is equivalent to S150: YES), and it may be determined whether an IP address contained in the monitored packet is an IP address assigned by APIPA (this step is equivalent to S170), for example.

In the present embodiment, determination results in steps S190-S210 are not outputted. However, the results may be displayed on an operation panel of the printer 10, printed via the print engine 22, outputted to the LAN via the network controller 20, or outputted to a not shown speaker as a voice message.

In the present embodiment, the printer comprises determination devices for both steps S190 and S200 as an example. However, the printer may comprise only one of the above devices. The determination in step S210 may be canceled.

In the present embodiment, an ICMP echo request for an address 255.255.255.255 is broadcast in step S130, and the apparatuses replying to the echo request (in the packet counter) and the apparatuses having an APIPA address (in the APIPA counter) among the apparatuses making replies are counted. Based on the results of the counts, the determination in steps S190-S210 is made. However, it is also possible to broadcast an ICMP echo request for an address 169.254.255.255 in step S130.

Configured as above, apparatuses replying to the broadcast are limited to those which are assigned an APIPA address. Therefore, only by counting the apparatuses replied (S150 and S160), the number of apparatuses having an APIPA address can be found, and a load to the network and the printer 10 itself is reduced (in this case, steps S170 and S180 are deleted). Based on the number of replied apparatuses having an APIPA address, determination equivalent to step S190 may be performed, and it is determined whether or not APIPA should be executed selectively (steps S200 and S210 are deleted).

In the present embodiment, the printer 10 is described as an example of an electronic apparatus. However, the electronic apparatus can be a personal computer connected to the LAN, and the printer 10 may only perform steps S120-S180 and print the determination results in steps S190-S210. In this manner, when the printer 10 is being connected to the LAN, it is possible to determine whether APIPA in the printer 10 should be activated based on the determination results performed by the personal computer. Accordingly, even if the printer 10 configured for APIPA is connected to a LAN which is not adopting APIPA, it is possible to take precautions against a possible accident in which communication is disabled due to automatic execution of APIPA.

Second Embodiment

Figure 5:
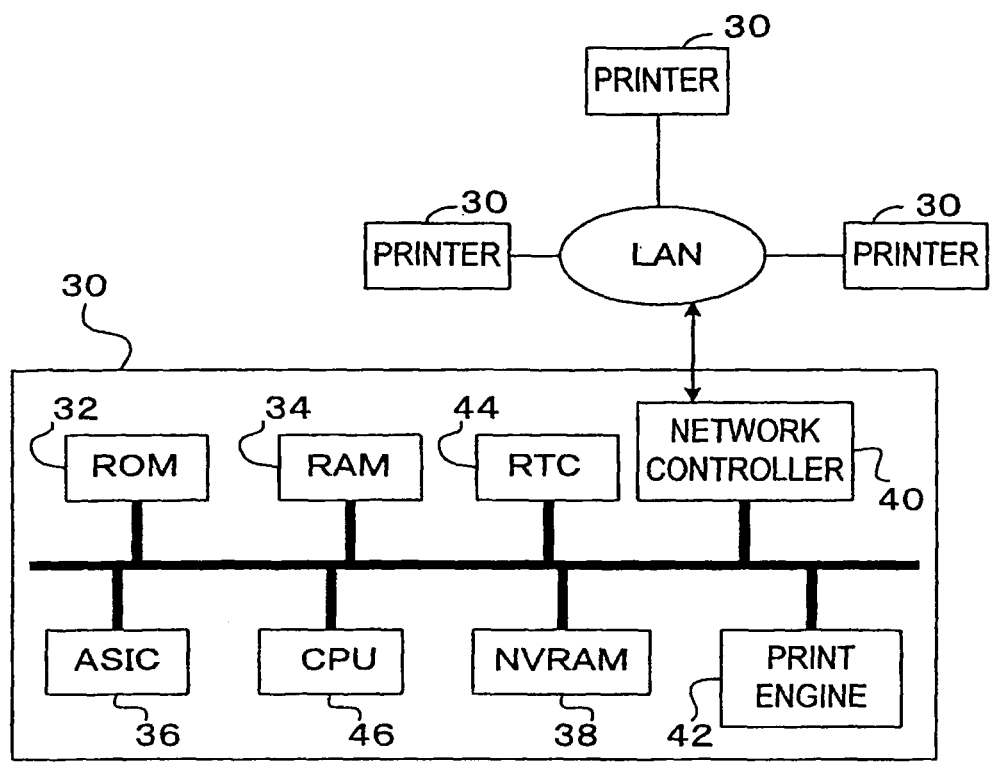
FIG. 5 is a block diagram showing a printer configuration as an electronic apparatus of the second embodiment.

FIG. 5 is a block diagram showing a printer 30 as an electronic apparatus of the present embodiment.

The printer 30 comprises a ROM 32 for storing data and programs necessary for various operations, a RAM 34 for storing temporary data, an ASIC 36 for executing application specific programs, a NVRAM 38 which is a rewritable nonvolatile memory for storing various settings including the address, priority, etc. of the printer 30, a network controller 40 for data transmission and reception by monitoring and receiving necessary packets passing through a LAN and transmitting packets to the LAN, a print engine 42 for printing, a realtime clock (RTC) 44 for keeping the present date and time, and a CPU 46 for controlling the foregoing components.

There are wide variety of apparatuses (not shown) connected to the LAN, such as a plurality of personal computers, etc. Each of the personal computers is provided with a printer driver for making a printing request to the printer 30 and a management tool for various settings.

In the printer 30, the CPU 46 executes the programs stored in the ROM 32 to control the network controller 40, etc., thereby communication over TCP/IP being enabled. The printer 30 receives printing requests and setting requests from the personal computers, etc. via the LAN and performs printing and setting. As an initialization process for realizing the communication, the printer 30 performs an address setting process for assigning itself an IP address for communication over TCP/IP after switched on. This address setting process is now explained by way of flowcharts shown in FIGS. 6A and 6B.

Figure 6A:
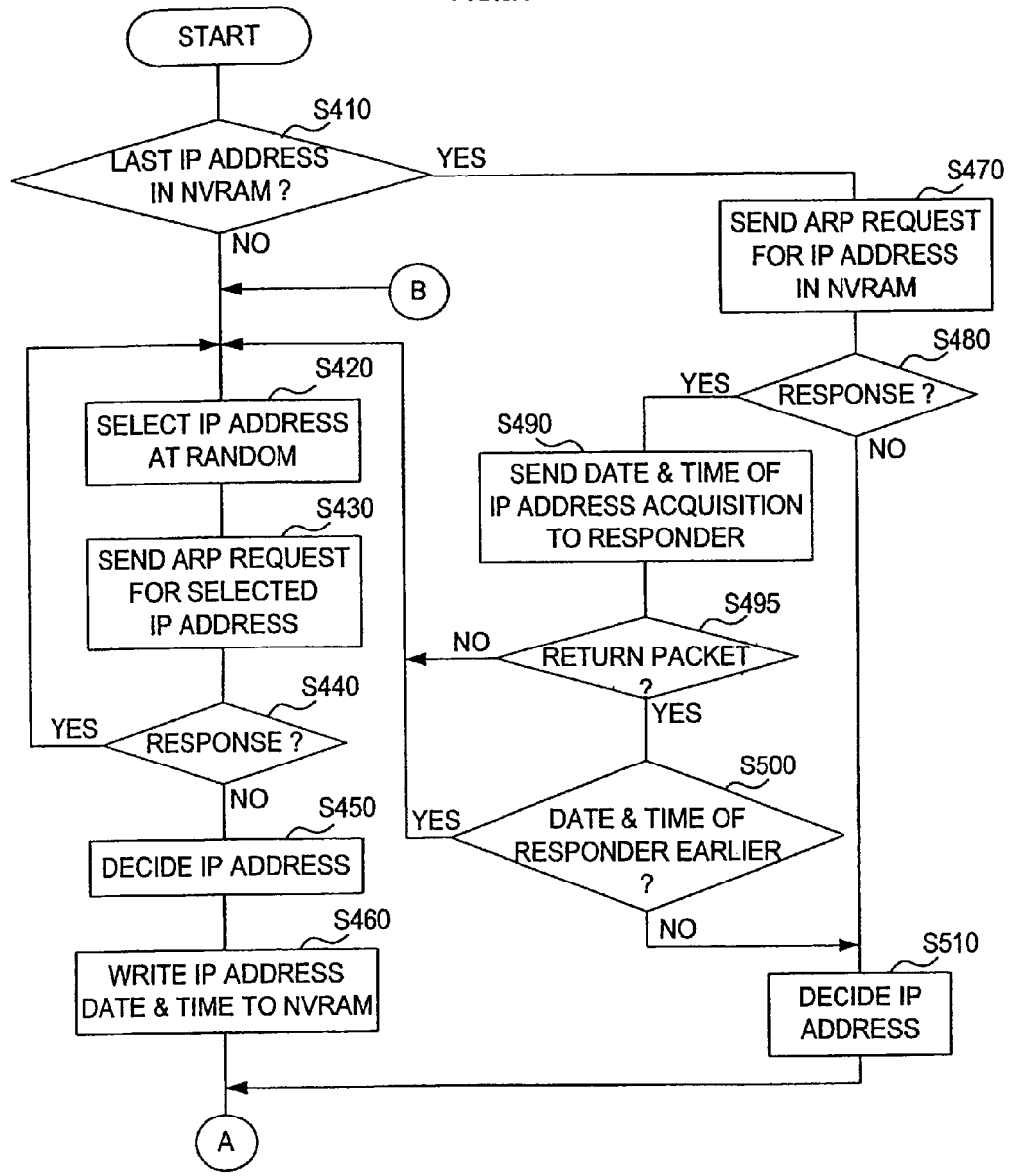
FIGS. 6A and 6B are flowcharts of an address setting process in the printer as an electronic apparatus of the second embodiment.

After the printer 30 is switched on, the CPU 46 determines whether the IP address, of the printer, used last time is written to (stored in) the NVRAM 38, as shown in step S410 in FIG. 6A. If the IP address has been written (S410: YES), the process moves to step S470. If the IP address is not written (S410: NO), the process moves to step S420.

Steps S420-S450 illustrate an IP address decision process through APIPA, which is shown in FIG. 4. Particularly, it is the process to select an IP address at random (S420), send an ARP request for the chosen IP address to the LAN from the network controller 40 (S430), and see whether there is a response to the ARP request in step S430 from the LAN to the network controller 40 (S440). In other words, it is determined whether the chosen IP address is being used by another apparatus in the LAN. If there is a response (S440: YES), the process returns to step S420 to select another IP address, since the chosen IP address is already in use. On the other hand, if there is no response (S440: NO), the chosen IP address is not in use, and is set to an IP address of the printer 30 (S450). As shown in FIG. 4, the address 169.254.78.22 is assigned to the printer 30, for example.

In step S460, the IP address decided in steps S420-S450 and the present date and time kept by the RTC 44 are written to (stored in) the NVRAM 38. The decided IP address 169.254.78.22 is written, for example.

In step S470, an ARP request for the IP address written to the NVRAM 38 is sent to the LAN. In step S480, it is determined whether there is a response to the request. In other words, it is verified whether the IP address stored in the NVRAM 38 is being used by another apparatus in the LAN.

If there is a response, that is, the IP address is being used by another apparatus (S480: YES), the process moves to step S490. If there is no response, that is, no apparatus is using the IP address (S480: NO), the process moves to step S510.

In step S490, the date and time written in step S460 are read from the NVRAM 38, and are sent to an apparatus which has responded (responder) in step S480.

As shown in FIG. 7A, in this transmission of date and time, a packet including a flag indicating a date and time request packet and information on the date and time of the IP address acquisition by the printer 30 (that is, the date and time read from the NVRAM 38) is sent by UDP (User Datagram Protocol). The destination address is the IP address of the apparatus which has responded (that is, the same IP address stored in the NVRAM 38), and a destination port number is 2436 defined for this request. FIG. 7A illustrates an example in which the IP address 169.254.78.22 stored in step S460 is being used by another apparatus (that is, there is an IP address conflict).

In step S495, it is determined whether a return packet (like the one shown in FIG. 7B) transmitted from the responder is received in response to the date and time request packet transmitted in step S490. When the return packet is not received (S495: NO), the process proceeds to step S420. If the return packet is received (S495: YES), the process proceeds to step S500. In step S500, date and time contained in the return packet transmitted from the responder is compared with the date and time read from the NVRAM 38. If the date and time in the responder side is later (S500: NO), the process goes to step S510. If there is no return packet from the responder (S495: NO), or the date and time in the responder side is earlier (S500: YES), the IP address of the printer 30 is decided through the aforementioned step S420 onward by APIPA. If no return packet is received in step S495 (S495: NO), it is considered that an apparatus having no reply function to the date and time request packet may have the same IP address as the printer 30, for example. In such cases in which priorities of other apparatuses cannot be known (no comparison are made due to unknown priorities) and the IP address of the printer 30 is maintained at discretion, there is a possibility that the same IP address may exist in the network. Therefore, it is desirable to assign the printer 30 another IP address by executing step S420 onward.

In step S510, the IP address stored in the NVRAM 38 is set to the IP address of the printer 30.

Accordingly, the printer 30 can use the IP address stored in the NVRAM 38, when the IP address stored in the NVRAM 38 does not conflict with the IP address currently used by another apparatus (S480: NO), and when the date and time of the IP address acquisition by another apparatus is later than the time and date of the IP address acquisition (time and date stored in step S460) by the printer 30 (S500: NO) even if the IP address stored in the NVRAM 38 does conflict with the IP address currently used by the another apparatus.

From now on, a process in which the printer 30 serves as the aforementioned another apparatus, that is, in case the printer 30 is the recipient of the date and time request packet transmitted in step S490, is explained.

Figure 6B:
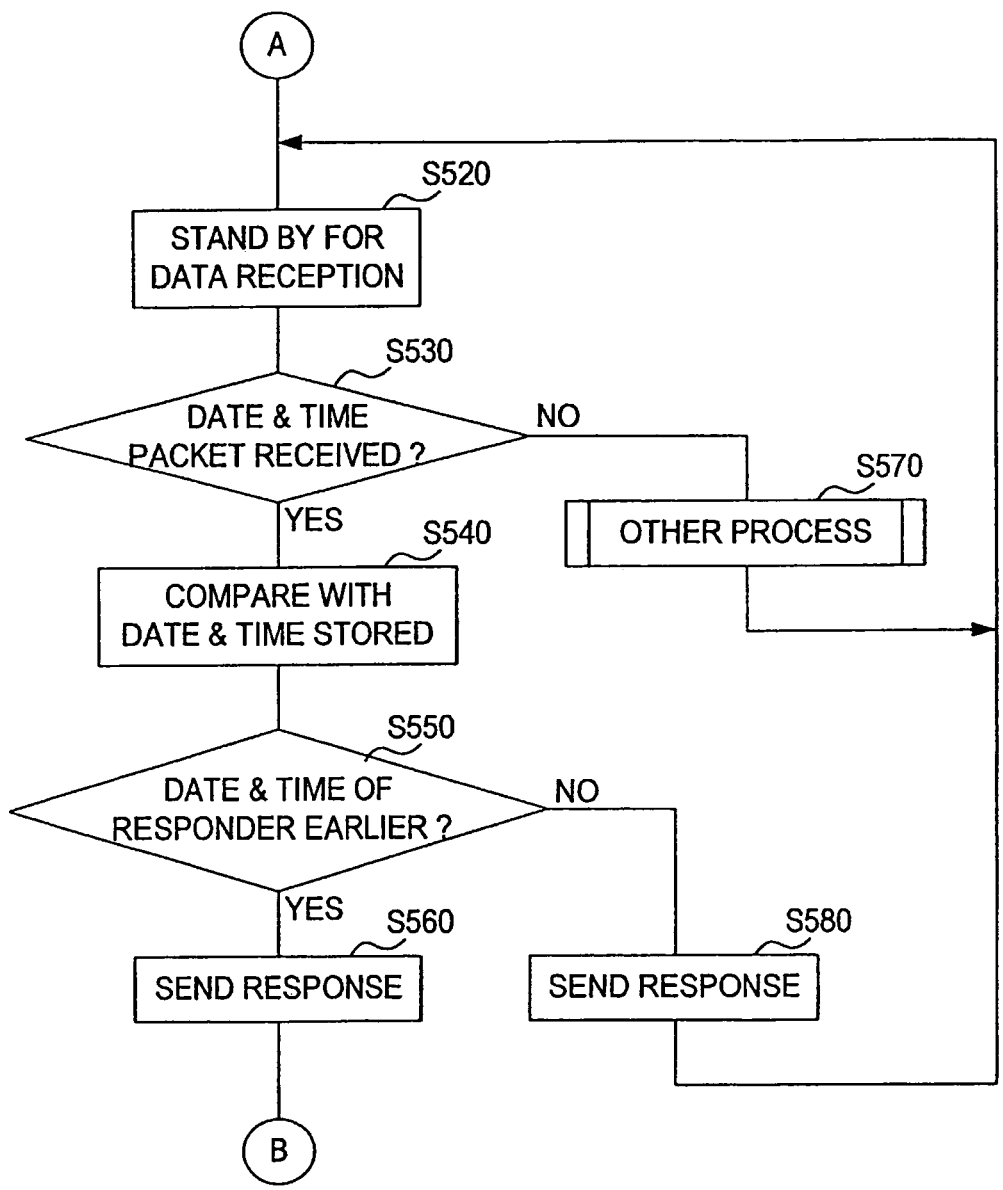

As shown in FIG. 6B, this process is performed after step S460 or S510 in FIG. 6A.

In step S520 in FIG. 6B, the process proceeds to step S530 when data is received from the LAN (that is, when data is received at the aforementioned UDP port number 2436).

In step S530, it is determined whether the received data is the date and time request packet. If it is the date and time request packet (S530: YES), the process proceeds to step S540. If it is not the date and time request packet (S530:NO), the process moves to step S570. In step S570, other operations except the address setting process are performed.

In step S540, the date and time contained in the received date and time request packet is compared with the date and time stored in the NVRAM 38. In step S550, it is determined whether the date and time contained in the received date and time request packet is earlier than the date and time stored in the NVRAM 38. If the date and time contained in the received date and time request packet is earlier than the date and time stored in the NVRAM 38 (S550: YES), the process moves to step S560. Otherwise (S550: NO), the process moves to step S580.

In steps S560 and S580, the date and time stored in the NVRAM 38 of the printer is sent as a reply to the sender of the date and time request packet. This reply is made via a packet as shown in FIG. 7B. Particularly, the IP address of the printer 30 is set to a source IP address, the destination address is set to a broadcast address, and the aforementioned UDP port number 2436 is set to the destination port number. Then, a packet including a flag indicating a return packet and information on the date and time when the IP address is acquired (that is, the date and time stored in the NVRAM 38) is transmitted.

After step S560, the process returns to step S420 in FIG. 6A, and a new IP address is again selected and determined by the aforementioned APIPA.

On the other hand, after step S580, the process moves to step S520. In short, the printer 30 uses the IP address continuously.

As above, when the IP address of the printer 30 conflicts with the IP address of another apparatus (S480: YES) and there is no reply from the another apparatus (S495: NO) or the date and time of the IP address acquisition by the printer 30 is later than the date and time of the IP address acquisition by the another apparatus (S500: YES), the printer 30 changes its IP address. If the IP address conflicts with the IP address of the another apparatus and the date and time of the IP address acquisition by the printer 30 is earlier than the date and time of the IP address acquisition by the another apparatus (S500: NO), the printer 30 can keep using its IP address.

Accordingly, even if another printer 30 is connected to a LAN to which the printer 30 is connected, the printer 30 which has been using the address for long can keep using the address without change. The users can send printing requests to the printer 30 which has been identified by the address for long to print from the personal computers on the LAN. In this way, it is possible to maintain stability of the network.

In the present embodiment, the printer 30 performs the processes shown in FIGS. 6 and 7. However, various apparatuses other than the printer can also perform those processes.

Additionally, in the present embodiment, the date and time when the IP address is assigned in step S460 is stored, and then, on the basis of priority, it is determined in steps S500 and S550 whether the apparatus continues to use the IP address. However, various information other than the date and time can be the basis of the determination. For example, instead of using the date and time in step S460, priority of the printer 30 itself (according to the rank of the user who uses the printer 30 or the rank given based on the characteristics of the apparatus itself, for instance) may be stored. Such priorities may be set via the LAN, or by means of an operation panel provided in the printer 30. The priority may be determined by comprehensive assessment of various kinds of priorities.

In the present embodiment, in order to obtain priorities of other apparatuses, the priority information transmitted from the other apparatuses in step S560 or S580 have to be received by the printer 30 (S495: YES). However, though it may bother the administrator or user, the priorities of the printer 30 and the other apparatuses as well may be inputted in advance in the printer 30. In this case, other apparatuses for which the priorities are not inputted by the administrator or user assign themselves another IP address (S420-S450), as in the case that no response is received from the other apparatuses concerning the date and time information in S495 (S495: NO), since their priorities are unknown.

Moreover, in the present embodiment, the printer 30 has the device that verifies that the same IP address is not used on the LAN, the device that compares the priorities, and the device that stores the priority data, as an example. However, these devices may be provided with a server on the network, and the server may compare the priorities and store the priority data. In other words, the printer 30 may only make inquiries to the server for the comparison results and the priorities. In this case, the verification steps S430-S440 and S470-S480 for ensuring that a certain IP address is not used by other apparatuses connected to the network may be replaced by the steps for making inquiries to the server and interpreting the resultant response from the server. Similarly, the steps S490-S500 for obtaining the results of the priority comparison between the printer 30 and the other apparatuses may be replaced by the steps for making inquiries to the server and interpreting the resulting response from the server. The server may be another printer connected to the LAN.

Third Embodiment

This embodiment relates to an address setting apparatus for assigning an address to an electronic apparatus in a network.

There is a network printer provided with a default address to be used when it fails to obtain an IP address from a DHCP server. The default address is, for example, an IP address of 192.0.0.192, a subnet mask of 0.0.0.0, and a gateway address of 0.0.0.0, as shown in FIG. 11.

There is also a management tool, running on a personal computer, for configuring an apparatus in a network. This tool communicates with the apparatus by the default address and changes the default address to which the user designates. It is possible to change the address of a printer connected to the network by executing the management tool on a personal computer connected to the network. Hereafter, the process of changing the address by the management tool is explained by way of FIG. 11.

As shown in FIG. 11, the personal computer broadcasts a request for the MAC address and sysObjectID over SNMP through the network. Various apparatuses connected to the network respond to this request and return their MAC addresses and sysObjectIDs. In these responses, the IP addresses of those apparatuses are also contained.

The personal computer which received these responses selects an apparatus of which vendor code contained in the sysObjectID is to be managed by the management tool and the IP address of which is set to a default address of the apparatus (that is, 192.0.0.192), and then displays the MAC address of the chosen apparatus as undefined apparatus in a dialog as shown in the middle portion of FIG. 11. In FIG. 11, two printers are identified as undefined apparatus of which address is not defined.

When the user selects the MAC address of the apparatus having the IP address to be defined with a mouse, etc. of the personal computer, an address setting form for the IP address, subnet mask and gateway address is displayed, to which the user can input those values using a keyboard, etc. For example, when the network address, subnet mask and gateway address of the personal computer executing the management tool are 192.168.123.0, 255.255.255.0 and 0.0.0.0, respectively, the user inputs an address 192.168.123.100, which is not being used by another computer in the network, for the IP address, and addresses 255.255.255.0 and 0.0.0.0 respectively for the subnet mask and gateway address of the printer. When these values are inputted, the personal computer broadcasts the inputted IP address, subnet mask and gateway address over SNMP through the network and instructions the printer to assign itself these addresses. At this time, the chosen MAC address is broadcast as "MAC address confirmation".

The apparatus which is identified by the MAC address confirmation assigns itself the sent IP address, subnet mask and gateway address. In the above example, the network address of 192.168.123.0, subnet mask of 255.255.255.0 and IP address of 192.168.123.100 are set as the static addresses of the printer. The management tool communicates with the printer by the address set as above to display the printer status and to change the printer settings.

As described above, the MAC address of the apparatus having a default IP address of 192.0.0.192 is shown in the dialog in FIG. 11. Here, if the user inputs a wrong network address for the chosen apparatus, a problem occurs that the settings of the apparatus are unable to be changed by the personal computer any longer. For instance, if the user inputs the address 192.186.123.100 by mistake for the apparatus in the aforementioned network, the management tool can no longer communicate with the apparatus and change the addresses of the printer with the management tool.

In addition, if the printer comprises an APIPA feature, the printer automatically assigns itself an address and then, the management tool is unable to assign the printer another address since the printer is not identified as undefined apparatus.

The present embodiment provides an address setting apparatus comprising an acquisition device that obtains the current address of the apparatus connected to a network, and a determination device that determines whether the obtained address is not of the network to which the address setting apparatus belongs and is also not a default address (initial address) of the apparatus, and a notification device that notifies information specifying the apparatus.

Here, the expression "the obtained address is not of the network to which the address setting apparatus belongs" means that the network addresses of the obtained address and of the address setting apparatus are not the same. For instance, if the network address and the IP address of the address setting apparatus are 192.168.123.0 and 192.168.123.20, respectively, and the address obtained is 192.186.123.100, the obtained address is not of the network to which the address setting apparatus belongs and also it is not the default address of the apparatus (for example, 192.0.0.192). As a result, the information specifying the apparatus having this address is notified.

Accordingly, even if the user changes the address of an apparatus to a wrong address which is not of the network to which the address setting apparatus belongs, it is possible to find the apparatus with the wrong address.

In addition, the address setting apparatus of the present embodiment comprises an input device that inputs an address to be assigned to the notified apparatus, and a transmission device that transmits instructions for the notified apparatus to assign itself the inputted address through the network. Therefore, it is easy for the user to correct the address of the apparatus which is assigned a wrong address.

It is preferable that the address setting apparatus of the present embodiment, when it is determined that the obtained address is an address to be used for an apparatus to assign itself, notifies information specifying the apparatus having the obtained address.

The address to be used for an apparatus to assign itself can be an IP address in a range which can be assigned by APIPA. In this manner, it is possible to change the address which the apparatus automatically assigned itself by the address setting apparatus of the present embodiment.

It is preferable that the notification device also notifies information specifying the address of the apparatus when it is determined that the obtained address is the default address of the apparatus. It is further preferable that the notification device can notify information specifying the apparatus when it is determined that the apparatus satisfies one of the aforesaid conditions: that is, when the address of the apparatus is of the network to which the address setting apparatus belongs; when the address of the apparatus is an address used for the apparatus to assign itself; and when the address of the apparatus is a default address of the apparatus.

It is preferable that the information specifying the apparatus to be notified are obtained when the acquisition device obtains the address of the apparatuses since this avoids heavy traffic in the network. The information may be the obtained address (IP address, for example), vendor code, or model of the apparatus. The information can also be the MAC address of the apparatus, or the factor in notifying the information specifying the apparatus. The factor in notifying the information specifying the apparatus may be such information that the address of the apparatus is not of the network to which the address setting apparatus belongs, that the address of the apparatus is a default address of the apparatus, and that the address of the apparatus is an address used for the apparatus to assign itself. By notifying the factor, the user can see why the address of the apparatus was obtained, and determine whether the address of the apparatus should be modified.

It is preferable to that the address setting apparatus comprises a selection device that lists the information specifying the apparatus and allows the user to select an apparatus if the apparatus notified is more than one.

Various protocols, such as SNMP, can be used for the address acquisition and transmission of address setting instructions. For example, SNMP broadcast can be used.

In case of a network in the IP environment, it is preferable that the address setting instructions contain an IP address, subnet mask, and gateway address. It is further preferable that the instructions contain the MAC address of the apparatus notified. Then, the apparatus in the network compares its MAC address and the MAC address transmitted, and when both addresses agree, assigns itself the transmitted IP address, subnet mask and gateway address.

If the address setting apparatus of the present embodiment is a computer, the above explained address setting function can be an executable program. Such a program may be stored in the storage media or transmitted via the network as described in the first and second embodiments.

The present embodiment will now be described, by way of example.

Figure 8:
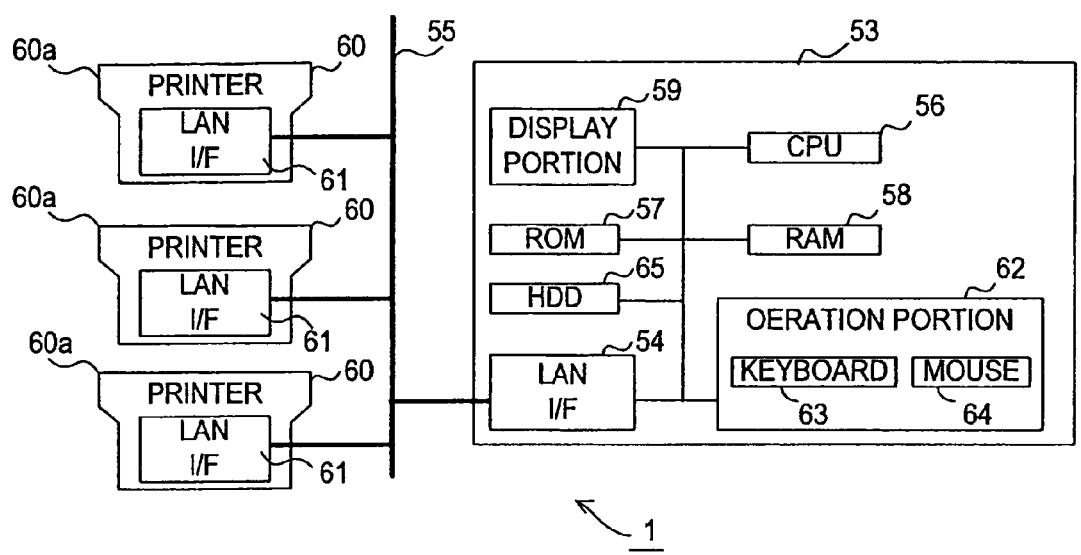
FIG. 8 is a block diagram showing a configuration of a communication system including a personal computer as an address setting apparatus of the third embodiment and a printer as an apparatus.

FIG. 8 is a block diagram illustrating a configuration of a communication system 1 which comprises printers 60a-60c (hereinafter, referred to as printers 60 as well) and a personal computer (PC) 53 as an address setting apparatus adapted for the present embodiment.

As shown in FIG. 8, the printers 60 and the personal computer 53 are connected to the communication system 1 and provided with LAN interfaces (I/F) 54, 61 which are respectively connected to a LAN cable 55 to build a local area network (LAN).

The printer 60 in the LAN comprise a print portion, a user interface (I/F), a communication control portion, the aforesaid LAN I/F 61, a USB interface (I/F) and a control portion, respectively, and prints the data transmitted from an external apparatus such as the personal computer 53 via the LAN. The print portion comprises a paper feeding and delivery mechanism, and a printing mechanism for printing data transmitted from the personal computer 53, etc. via the LAN I/F 61. The user I/F comprises a display portion such as a liquid crystal display, and an operation portion such as a key switch. In the user I/F, instructions corresponding to user operations are inputted to the control portion from the operation portion, and a message, etc. transmitted from the control portion is displayed on the display portion. On the display portion, information indicating the running status of the printers 60 and the settings of the address, etc. of the LAN I/F 61 are displayed, for example.

The LAN I/F 61 connects the printers 60 to the LAN, and via the LAN, it realizes bi-directional communication with the personal computer 53 and other apparatuses in the LAN. For instance, the LAN I/F 61 obtains printing data from the external apparatus (such as the personal computer 53) over TCP/IP, IPX/SPX, etc. Then, it inputs the data to the control portion and reports the running status of the printers 60 to the external apparatus (such as the personal computer 53) according to the instructions from the control portion.

The LAN I/F 61 can also communicate with the external apparatus (personal computer 53) over SNMP, and as will be explained later, it communicates with the address setting apparatus (personal computer 53) over SNMP and operates address data stored in the control portion according to the instructions from the address setting apparatus (personal computer 53 in the present embodiment).

The printers 60a and 60b are given an IP address of 192.0.0.192, a subnet mask of 0.0.0.0 and a gateway address of 0.0.0.0 as default address before shipped. The printer 60c automatically assigns itself an IP address in the range from 169.254.1.0-169.254.254.255 by APIPA after started. The MAC addresses of the printers 60a, 60b and 60c are, respectively, 00:80:77:12:34:56, 00:80:77:34:5 E:FD and 00:80:77: E2:A5:33.

The personal computer 53 is assigned an IP address of 192.168.123.20, a subnet mask of 255.255.255.0 and a gateway address of 0.0.0.0. A printer driver for transmitting printing data to the printers 60 via the LAN and a management tool for configuring the printers 60 via the LAN are installed to a hard disk drive (HDD) 65 of the personal computer 53. This management tool is distributed by recording media such as a CD-ROM and DVD, or over networks. The user installs the management tool to the HDD 65 of the personal computer 53, and the CPU 56 executes the program of the management tool installed to the personal computer 53 so that the personal computer 53 functions as an address setting apparatus adapted for the present embodiment. The personal computer 53 is an ordinary computer comprising a nonvolatile storage medium ROM 57, a readable and writable storage medium RAM 58, the HDD 65, etc. The display portion 59 comprises an LCD, etc., and displays a list of MAC addresses of the printers 60 and an address setting form. The operation portion 62 comprises a keyboard 63, a mouse 64, etc. The operation portion 62 allows the user to select a desired MAC address from the list of MAC addresses of the printers 60 and to input a desired IP address, etc. to the address setting form displayed on the display portion 59.

Figure 9:
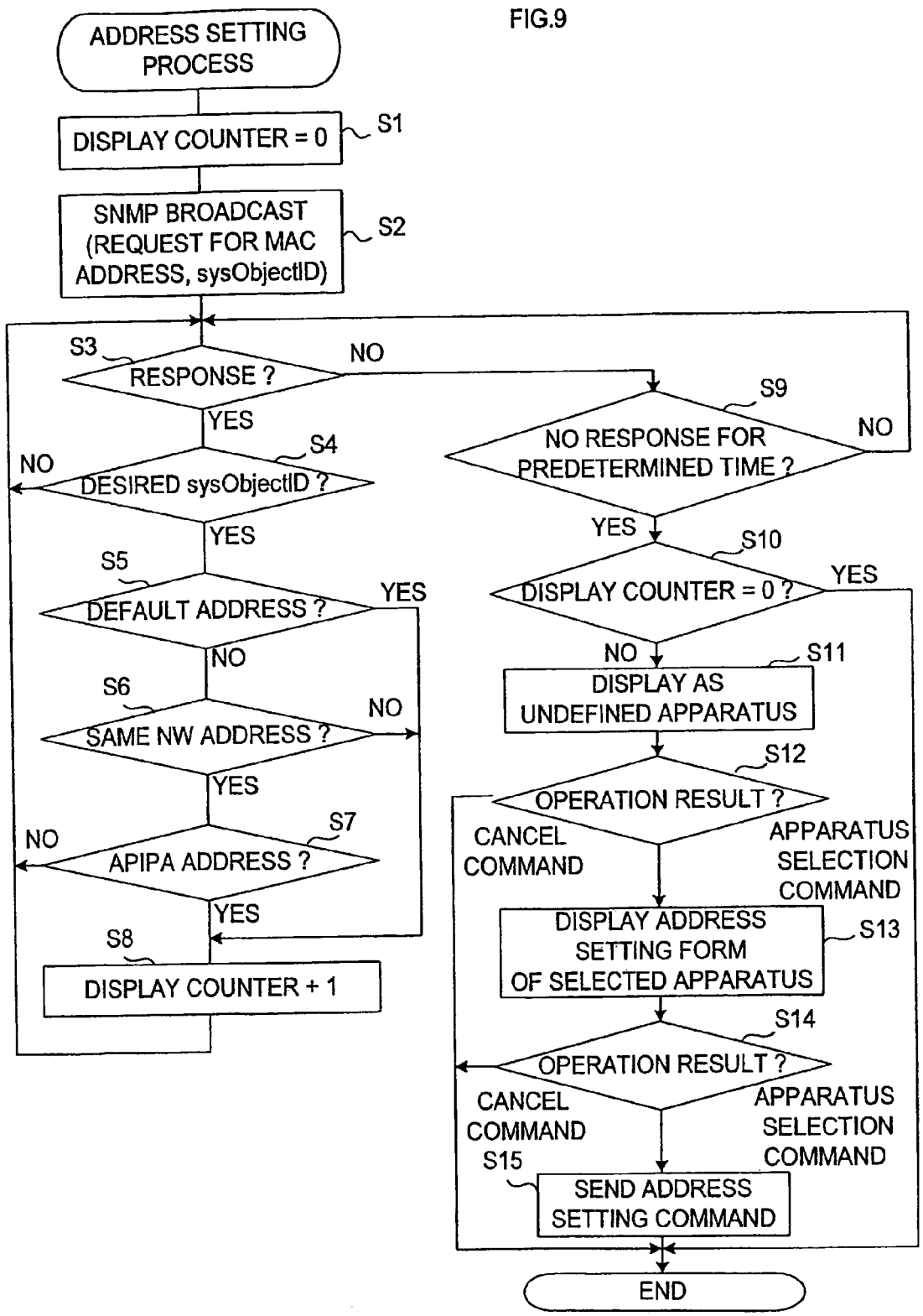
FIG. 9 is a flowchart illustrating an address setting process in the personal computer as an address setting apparatus of the third embodiment.

Hereafter, an address setting process performed by the management tool on the personal computer 53 is described by way of a flowchart shown in FIG. 9. The personal computer 53 functions as an address setting apparatus of the present embodiment.

When the user instructions via the operation portion 62 are acknowledged, the value of a display counter stored in the RAM 58 is set to zero (0) (S1), and then a request for a MAC address and sysObjectID is broadcast over SNMP through the LAN (S2).

It is determined whether there is a response to the SNMP broadcast in step S2 from an apparatus in the LAN. If there is a response (S3: YES), it is determined whether the returned sysObjectID is the desired one (S4). In other words, it is determined whether the apparatus which has responded is an apparatus to be managed by the management tool based on the vendor code contained in the sysObjectID. If the returned sysObjectID is not the desired one (S4: NO), the apparatus is determined not to be managed by the management tool, and the process returns to step S3 to check a response from another apparatus.

If it is determined in step S4 that the returned sysObjectID is the desired one (S4: YES), it is determined whether the IP address of the apparatus which has responded is a default address of the apparatus (S5), whether the IP address of the apparatus has the same network address as the personal computer 53, that is, whether the network address of the apparatus is of the network to which the personal computer 53 belongs (S6), or whether the IP address of the apparatus is an address in a range which can be assigned by APIPA (S7). If the IP address of the apparatus is a default address of the apparatus (S5: YES), the network address of the apparatus is not of the network to which the personal computer 53 belongs (S6: NO), and the IP address of the apparatus is an address in the range which can be assigned by APIPA (S7: YES), then, information on the apparatus are stored in the RAM 58 as the information of the undefined apparatus and the value of the display counter is incremented (S8). If the IP address of the apparatus is not a default address of the apparatus (S5: NO), the network address of the apparatus is of the network to which the personal computer 53 belongs (S6: YES), and the IP address of the apparatus is not an address in the range which can be assigned by APIPA (S7: NO), then the process returns to step S3 to check a response from another apparatus since it is not necessary to display the apparatus as undefined apparatus.

If there is no response from other apparatuses in step S3 (S3: NO), it is determined whether no response has been received for a predetermined time (S9). If the predetermined time has not passed (S9: NO), the process returns to step S3. If no response has been received for the predetermined time (S9: YES), it is determined whether the value of the display counter is zero (0) (S10). If the value of display counter is zero (0) (S10: YES), the address setting process is ended since there is no undefined apparatus. If the value of the display counter is not zero (0) (S10: NO), a list of MAC addresses of the apparatuses stored in the RAM 58 in step S8 is displayed on the display portion 59 (refer to the middle part of the later explained FIG. 10) (S11).

Then, the user gives instructions via the operation portion 62 to the list of MAC addresses of the apparatuses displayed on the display portion 59 in step S11 (S12). If the instructions are to cancel (S12: cancel command), the address setting process is ended. If the user selects an apparatus to set the address (S12: apparatus selection command), the address setting form (not shown) for the chosen apparatus is displayed on the display portion 59 (S13).

If the user inputs an IP address, a subnet mask and a gateway address for the chosen apparatus by the keyboard 63 of the operation portion 62 to the address setting form displayed on the display portion 59 (S14: address setting command), the inputted IP address, subnet mask, gateway address are broadcast through the LAN over SNMP (S15), and a request is sent to the chosen apparatus to assign itself the addresses, and the address setting process is ended. If the address setting is canceled by the user (S14: cancel command), the address setting process is ended.

Figure 10:
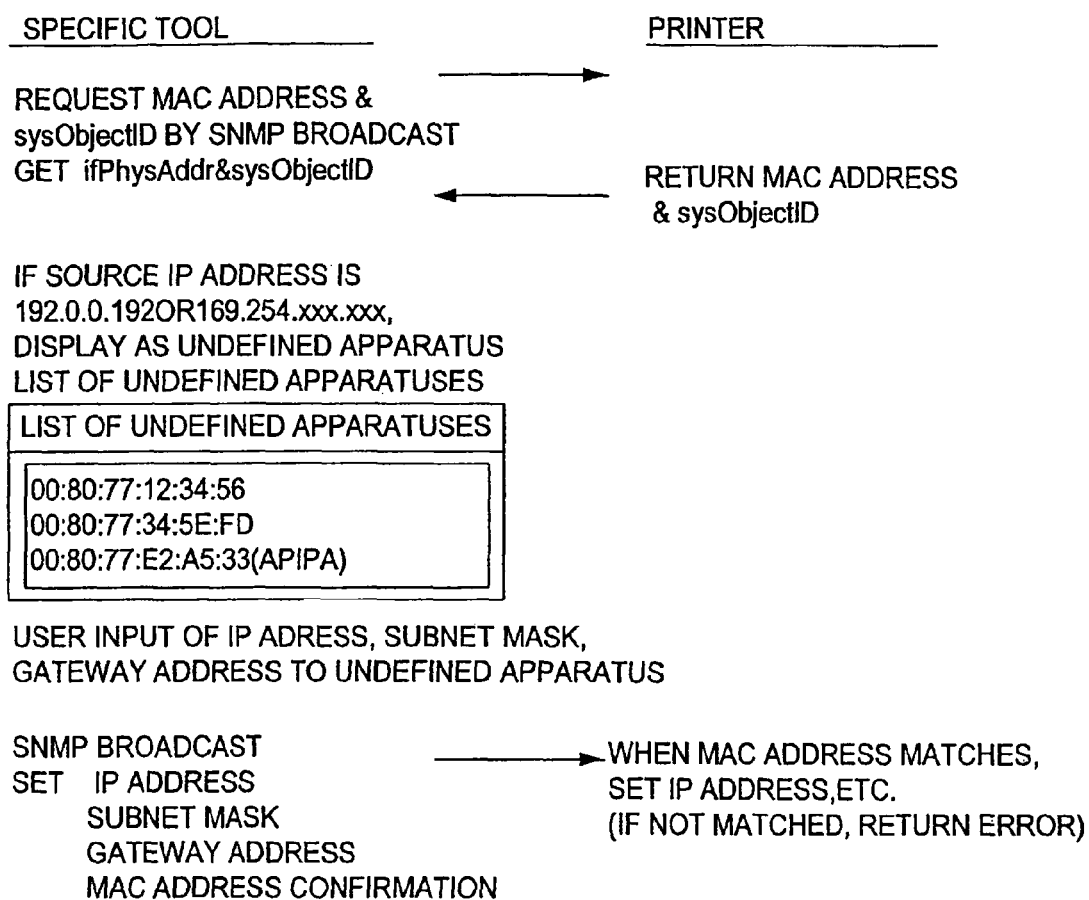
FIG. 10 is an explanatory view showing an address setting process in the personal computer as an address setting apparatus of the third embodiment and annunciation text to a user.

A specific example of the operations of the aforementioned address setting process is described below. As shown in FIG. 10, the personal computer 53 broadcasts a request for a MAC address and sysObjectID over SNMP through the LAN.

Various apparatuses including the printers 60 connected to the LAN return their MAC addresses and sysObjectIDs in response to the SNMP broadcast. The IP addresses of the respective apparatuses are also contained in these responses.

The personal computer 53, which has received the returned MAC addresses and sysObjectIDs, displays the MAC addresses of the apparatuses which satisfy the following conditions: the vendor code indicated by the sysObjectID is of the printers 60 to be managed by the management tool; and the source IP address of the returned IP address is one of the default address of the printers 60a, 60b (i.e. 192.0.0.192) and is also an address in the range from 169.254.1.0-169.254.254.255 which can be assigned by APIPA, as undefined apparatus in a dialog as shown in the middle part of FIG. 10. Not only the MAC address but also the factor in notifying the information are also shown. In other words, if the returned IP address is an address in the range for APIPA, indication of (APIPA) is added to the MAC address, and if it is the default address, only the MAC address is shown.

Accordingly, as shown in FIG. 10, the respective MAC addresses of the printers 60 are shown. With respect to the printer 60c, indication of (APIPA) is added to the MAC address.

With such indication, the user can identify the MAC address of the apparatus which is assigned neither IP address obtained by a DHCP server nor a static address. Also, the user can see whether the IP address of the apparatus having the displayed MAC address is a default address or an address assigned by APIPA.

The user can select the MAC address of the apparatus of which IP address, etc. is to be changed from a list of the MAC addresses by means of the mouse 64 and the keyboard 13 provided with the personal computer 53.

For example, if the user wishes to change the IP address of the printer 60c to an IP address of 192.168.123.100 which contains the network address of the LAN to which the personal computer 53 is connected, the user selects the MAC address of 00:80:77:E2:A5:33 (APIPA) in the dialog shown in the middle part of FIG. 10.

The personal computer 53, when it detects such selection, displays a not shown setting form for an IP address, subnet mask and gateway address input. The user can make an input to the setting form via the keyboard 63, etc.

The user inputs an IP address of 192.168.123.100, a subnet mask of 255.255.255.0 and a gateway address of 0.0.0.0 as the addresses to be assigned to the printer 60c.

When these addresses are inputted, the personal computer 53 broadcasts the inputted IP address, subnet mask and gateway address over SNMP through the LAN, and requests the printer 60c to assign itself these addresses. In this respect, the personal computer 53 broadcasts the selected MAC address as "MAC address confirmation".

Among the apparatuses in the LAN, the apparatus having the same MAC address as the MAC address confirmation assigns itself the requested IP address, subnet mask, gateway address. In other words, the printer 60c assigns itself an IP address of 192.168.123.100, a subnet mask of 255.255.255.0 and a gateway address of 0.0.0.0.

In the above manner, it is possible to change the address of the printer 60c of which address was once assigned by APIPA.

In the above shown example, it is also possible to configure both the new type of printer 60c and the conventional printers 60a 60b by the same management tool.

In the specific operation example according to FIG. 10, the MAC address of the apparatus is displayed if the source IP address is a default address or an address in the range to be assigned by APIPA. However, it is also possible to display the MAC address of the apparatus if the source IP address contains a network address different from the network address of the LAN to which the personal computer 53 belongs. In this manner, even if the user assigns a wrong IP address of 192.186.123.100 to the printer 60c in the above example, the MAC address of the printer 60c is displayed in the dialog as undefined apparatus. Accordingly, if a wrong IP address is assigned, it is possible to correct the error.

Furthermore, in case that the personal computer 53 is assigned an IP address by APIPA, it can communicate with the apparatus having an address in the range to be assigned by APIPA. In this case, the MAC address of the apparatus which has such an address may not be necessarily displayed in the dialog.

In the above embodiment, the device that notifies the undefined apparatus to the user is the display portion 59. However, the notification may be given to the user as a voice message. Furthermore, addresses inputted by the user via the operation portion 62 in the above embodiment may be inputted by the user voice.

The present invention should not be limited to the embodiments described below, and other modifications and variations may be possible without departing from the technical scope of the invention.

What is claimed is:

1. An electronic apparatus which can communicate via a network and has a function to automatically assign itself an address for communication, the electronic apparatus comprising:

an acquisition device that obtains an address from at least one network-connectable apparatus on the network;

a determination device that determines whether or not the electronic apparatus should automatically assign itself an address to establish communication via the network, based on whether the address obtained by the acquisition device is an address within an address range which the network-connectable apparatus can determine by a function to assign itself an address;

a selection device that selects an address from the address range, within which the network-connectable apparatus can determine an address by a function to assign itself an address, when the determination device determines that the electronic apparatus should automatically assign itself an address;

a verification device that verifies whether the address chosen by the selection device is not being used by another electronic apparatus in the network; and an address decision device that assigns the electronic apparatus the chosen address when the verification device verifies that the chosen address is not being used by another electronic apparatus in the network;

wherein said address is an IP address, said determination device makes an inquiry directed to a network address of a predetermined address group within the address range by broadcasting a request, and performs said determination based on the response to the broadcast, and said determination device determines that the electronic apparatus having a function to automatically assign itself an address should automatically assign itself an address when more than a predetermined ratio of apparatuses which are assigned an address of said predetermined address group are detected as a result of said inquiries.

2. The electronic apparatus as set forth in claim 1 wherein the verification device includes:

an inquiry unit that makes an inquiry on whether there is another electronic apparatus assigned the address chosen by the selection device in the network; and a response determination unit that determines whether or not a response to the inquiry is received; and the verification device verifies that the chosen address is not being used when there is no response to the inquiry.

3. The electronic apparatus as set forth in claim 1 wherein said predetermined address group is within an address range called linklocal address.

4. The electronic apparatus as set forth in claim 1 wherein said determination device performs determination based on an inquiry made to apparatuses on said network.

5. The electronic apparatus as set forth in claim 1 wherein said determination device determines that the electronic apparatus having a function to automatically assign itself an address should automatically assign itself an address when more than a predetermined number of apparatuses which are assigned an address of said predetermined address group are not detected and when more than the predetermined ratio of apparatuses which are assigned an address of said predetermined address group are detected.

6. The electronic apparatus as set forth in claim 1 wherein said determination device monitors an address contained in a packet exchanged between apparatuses in said network, and performs said determination based on the monitoring.

7. The electronic apparatus as set forth in claim 6 wherein said determination device determines that the electronic apparatus having a function to automatically assign itself an address should automatically assign itself an address when more than a predetermined number of apparatuses which are assigned an address of said predetermined address group are detected as a result of said inquiries and monitoring.

8. The electronic apparatus as set forth in claim 6 wherein said determination device determines that the electronic apparatus having a function to automatically assign itself an address should automatically assign itself an address, when the number of responses to said broadcast or the number of said packets monitored does not reach a predetermined number, even if more than the predetermined number or ratio of apparatuses which are assigned an address of said predetermined address group are not detected.

9. The electronic apparatus as set forth in claim 1 wherein said determination device repeats said determination when it is determined that the electronic apparatus having a function to automatically assign itself an address should automatically assign itself an address.

10. The electronic apparatus as set forth in claim 1 wherein the electronic apparatus is given a predetermined default address before it is assigned an address by said address decision device.

11. The electronic apparatus as set forth in claim 1 wherein said determination device performs said determination when the electronic apparatus is started.

12. An electronic apparatus which can communicate via a network and has a function to automatically assign itself an address for communication, the electronic apparatus comprising:

an acquisition device that obtains an address from at least one network-connectable apparatus on the network;

a determination device that determines whether or not the electronic apparatus should automatically assign itself an address to establish communication via the network, based on whether the address obtained by the acquisition device is an address within an address range which the network-connectable apparatus can determine by a function to assign itself an address;

a selection device that selects an address from the address range, within which the network-connectable apparatus can determine an address by a function to assign itself an address, when the determination device determines that the electronic apparatus should automatically assign itself an address;

a verification device that verifies whether the address chosen by the selection device is not being used by another electronic apparatus in the network; and an address decision device that assigns the electronic apparatus the chosen address when the verification device verifies that the chosen address is not being used by another electronic apparatus in the network;

wherein said determination device monitors an address contained in a packet exchanged between apparatuses in said network, and performs said determination based on the monitoring, and said determination device determines that the electronic apparatus having a function to automatically assign itself an address should automatically assign itself an address when more than a predetermined ratio of apparatuses which are assigned an address of a predetermined address group within the address range are detected as a result of said monitoring.

13. The electronic apparatus as set forth in claim 12 wherein the verification device includes:

an inquiry unit that makes an inquiry on whether there is another electronic apparatus assigned the address chosen by the selection device in the network; and a response determination unit that determines whether or not a response to the inquiry is received; and the verification device verifies that the chosen address is not being used when there is no response to the inquiry.

14. The electronic apparatus as set forth in claim 12 wherein said predetermined address group is within an address range called linklocal address.

15. The electronic apparatus as set forth in claim 12 wherein said determination device determines that the electronic apparatus having a function to automatically assign itself an address should automatically assign itself an address when more than a predetermined number of apparatuses which are assigned an address of said predetermined address group are not detected and when more than the predetermined ratio of apparatuses which are assigned an address of said predetermined address group are detected.

16. The electronic apparatus as set forth in claim 12 wherein said determination device repeats said determination when it is determined that the electronic apparatus having a function to automatically assign itself an address should automatically assign itself an address.

17. The electronic apparatus as set forth in claim 12 wherein the electronic apparatus is given a predetermined default address before it is assigned an address by said address decision device.

18. The electronic apparatus as set forth in claim 12 wherein said determination device performs said determination when the electronic apparatus is started.

19. A non-transitory computer readable medium storing a program for controlling an electronic apparatus which can communicate via a network and has a function to automatically assign itself an address for communication, the program comprising:

instructions for obtaining an address from at least one network-connectable apparatus on the network;

instructions for determining whether or not the electronic apparatus should automatically assign itself an address to establish communication via the network, based on whether the obtained address is an address within an address range which the network-connectable apparatus can determine by a function to assign itself an address;

instructions for selecting an address from the address range, within which the network-connectable apparatus can determine an address by a function to assign itself an address, when the determining determines that the electronic apparatus should automatically assign itself an address;

instructions for verifying whether the chosen address is not being used by another electronic apparatus in the network; and instructions for assigning the electronic apparatus the chosen address when the verifying verifies that the chosen address is not being used by another electronic apparatus in the network, wherein said address is an IP address, said determining makes an inquiry directed to a network address of a predetermined address group within the address range by broadcasting a request, said determining being based on the response to the broadcast, and said determining determines that the electronic apparatus having a function to automatically assign itself an address should automatically assign itself an address when more than a predetermined ratio of apparatuses which are assigned an address of said predetermined address group are detected as a result of said inquiries.

20. A non-transitory computer readable medium storing a program for controlling an electronic apparatus which can communicate via a network and has a function to automatically assign itself an address for communication, the program comprising:

instructions for obtaining an address from at least one network-connectable apparatus on the network;

instructions for determining whether or not the electronic apparatus should automatically assign itself an address to establish communication via the network, based on whether the obtained address is an address within an address range which the network-connectable apparatus can determine by a function to assign itself an address;

instructions for selecting an address from the address range, within which the network-connectable apparatus can determine an address by a function to assign itself an address, when the determining determines that the electronic apparatus should automatically assign itself an address;

instructions for verifying whether the chosen address is not being used by another electronic apparatus in the network; and instructions for assigning the electronic apparatus the chosen address when the verifying verifies that the chosen address is not being used by another electronic apparatus in the network, wherein said determining monitors an address contained in a packet exchanged between apparatuses in said network, said determining being based on the monitoring, and said determining determines that the electronic apparatus having a function to automatically assign itself an address should automatically assign itself an address when more than a predetermined ratio of apparatuses which are assigned an address of a predetermined address group within the address range are detected as a result of said monitoring.

* * * * *